(12) United States Patent
Blainey et al.

(10) Patent No.: US 7,581,222 B2
(45) Date of Patent: Aug. 25, 2009

(54) SOFTWARE BARRIER SYNCHRONIZATION

(75) Inventors: Robert James Blainey, Newmarket (CA); Guansong Zhang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 10/718,293

(22) Filed: Nov. 20, 2003

(65) Prior Publication Data
US 2004/0187118 A1   Sep. 23, 2004

(30) Foreign Application Priority Data
Feb. 20, 2003   (CA) ................... 2419340

(51) Int. Cl.
*G06F 9/46* (2006.01)
(52) U.S. Cl. .................... 718/102
(58) Field of Classification Search ............ 718/102
See application file for complete search history.

(56) References Cited

U.S. PATENT DOCUMENTS 5,278,975 A * 1/1994 Ishihata et al. ............ 713/375
5,448,732 A * 9/1995 Matsumoto ............... 718/104
5,887,167 A   3/1999 Sutton .................... 709/314
6,263,406 B1  7/2001 Uwano et al. ............. 711/141

* cited by examiner

*Primary Examiner*—Van H Nguyen
*Assistant Examiner*—Mengyao Zhe
(74) *Attorney, Agent, or Firm*—David A. Mims, Jr.; Volel Emile

(57) ABSTRACT

The present invention provides an approach for barrier synchronization. The barrier has a first array of elements with each element of the first array having an associated process, and a second array of elements with each element of the second array having an associated process. Prior to use, the values or states of the elements in each array may be initialized. As each process finishes its phase and arrives at the barrier, it may update the value or state of its associated element in the first array. Each process may then proceed to spin at its associated element in the second array, waiting for that element to switch. When the values or states of the elements of the first array reach a predetermined value or state, an instruction is sent to all of the elements in the second array to switch their values or states, allowing all processes to leave.

18 Claims, 7 Drawing Sheets

SOFTWARE BARRIER SYNCHRONIZATION

BACKGROUND OF THE INVENTION

The present invention relates to synchronization of concurrently running processes in a data processing system.

Parallel computing allows a computational problem to be decomposed into multiple tasks. These multiple tasks are then carried out by a plurality of processes which may operate concurrently. Parallel computing may allow a computational problem to be solved in a shorter amount of time by utilizing the computational resources of a plurality of processors. Parallel computing may also allow large computational problems to be solved that may not be practical to solve using conventional computing systems and methods. With currently available parallel computing systems, it is possible to harness the computational resources of hundreds or thousands of computer processors to run hundreds or thousands of concurrent processes.

Typically, there are interdependencies between at least some of the concurrent processes. In order to avoid a condition where one process races too far ahead of another interdependent process (which may cause an indeterminate computational result), it is often necessary to incorporate a process synchronization mechanism, such as a barrier synchronization point. Multiple threads or processes may then come to the barrier synchronization point, and wait until all of the other concurrent processes have arrived. Once synchronized in this manner, the processes may then continue with their execution separately. Thus, barrier synchronization is considered to be one of the most important mechanisms in parallel processing. This is reflected in published shared memory parallel programming standards, such as OpenMP™, in which combined parallel work-sharing constructs have implicit barrier synchronization (although these implicit barriers may be turned off if necessary by a no-wait clause).

Different designs for barrier synchronization have been proposed. For example, an IBM Technical Disclosure Bulletin entitled "Barrier Synchronization Using Fetch-and-Add and Broadcast", 34(8):33-34, 1992, describes a fetch-and-add operation to decrease an established counter, and then have waiting threads monitor the counter to determine when they may proceed. As another example, U.S. Pat. No. 6,330,619 issued to Kreuzberg describes use of different memory words for different synchronization states without using special hardware instructions.

While these methods provide possible barrier synchronization solutions, it is desirable to develop a system and method for barrier synchronization having increased performance.

SUMMARY OF THE INVENTION

The present invention provides an approach for barrier synchronization. The barrier has a first array of elements with each element of the first array having an associated process, and a second array of elements with each element of the second array having an associated process.

In an exemplary embodiment, prior to use, the values or states of the elements in each array may be initialized. As each process finishes its phase and arrives at the barrier, it may update the value or state of its associated element in the first array. Each process may then proceed to spin at its associated element in the second array, waiting for that element to switch. One of the concurrent processes may be designated to monitor the first array of elements, checking for all of the values or states of the elements of the first array to reach a predetermined value or state. Upon occurrence of this event, the designated process may instruct all of the elements in the second array to switch their values or states, allowing all processes to leave.

In an embodiment, upon all of the values of the elements of the first array reaching the predetermined value, and before the instruction is issued to switch the elements of the second array, the elements of the first array may be reinitialized.

In an alternative embodiment, the monitoring function may be conducted by an independent process that is not one of the concurrent processes having an associated element in each of the first and second arrays.

Accordingly, in a first aspect of the invention, there is provided a method of synchronizing at least two concurrently running processes in a data processing system, comprising:

(a) providing a first array of elements with initialized states, each element of said first array having a concurrently running process associated therewith, each element of said first array being configured to have its state updated by its associated concurrently running process upon completion of a phase by said associated concurrently running process;

(b) providing a second array of elements with initialized hold states, each element of said second array having a concurrently running process associated therewith, each element of said second array being configured to switch, upon receiving an instruction, to a release state;

(c) arranging for monitoring said first array of elements and, upon each element of said first array having had its state updated, arranging for generating said instruction for switching said elements of said second array to said release state.

In an embodiment of the first aspect of the invention, the method further comprises:

(d) for each process of said at least two concurrently running processes, configuring said each process such that, upon completion of said phase and upon updating of its associated element of said first array, said each process then waits at its associated element of said second array for said release state.

In a second aspect of the invention, there is provided a system for synchronizing at least two concurrently running processes in a data processing system, comprising:

(a) a first array of elements, each element of said first array having a concurrently running process associated therewith, said each element of said first array being configured to have an initial state that may be updated by its associated concurrently running process, upon completion of a phase by said associated concurrently running process;

(b) a second array of elements, each element of said second array having a concurrently running process associated therewith, said each element of said second array being configured to have an initial hold state that may be switched, upon receiving an instruction, to a release state;

(c) a monitoring process for monitoring said first array of elements, said monitoring process being configured to generate said instruction for switching said elements of said second array to said release state, upon each element of said first array having had its state updated.

In a third aspect of the invention, there is provided a processor for executing a process in order to synchronize said process with at least one other concurrently running process, said processor being operable to:

access an element of a first array of elements, said element of said first array being associated with said process, said element of said first array having an initial state;

update said element of said first array of elements upon completion of a phase by said process;

after said updating, access an element of a second array of elements, said element of said second array being associated with said process, said element of said second array having an initial hold state and being configured to switch, upon receiving an instruction, to a release state, and check said element of said second array for said switch to said release state until detecting said release state.

In a fourth aspect of the invention, there is provided a processor for executing a process in order to synchronize at least two concurrently running processes, said processor being operable to:

access a first array of elements, each element of said first array of elements being associated with one of said at least two concurrently running process and having an initial state;

monitor all elements of said first array of elements until detecting that each of said elements of said first array has been updated by its associated process; and thereafter generate an instruction to switch all elements of a second array of elements from an initial hold state to a release state, each element of said second array of elements being associated with one of said at least two concurrently running processes.

In a fifth aspect of the invention, there is provided a computer program product for synchronizing at least two concurrently running processes in a data processing system, the computer program product comprising:

a computer useable medium having computer readable program code means embodied in the medium for synchronizing at least two concurrently running processes, the computer program code means including:

computer readable program code means for providing a first array of elements with initialized states, each element of said first array having a concurrently running process associated therewith, each element of said first array being configured to have its state updated by its associated concurrently running process upon completion of a phase by said associated concurrently running process;

computer readable program code means for providing a second array of elements with initialized hold states, each element of said second array having a concurrently running process associated therewith, each element of said second array being configured to switch, upon receiving an instruction, to a release state;

computer readable program code means for monitoring said first array of elements and, upon each element of said first array having had its state updated, generating said instruction for switching said elements of said second array to said release state.

In an embodiment of the fifth aspect of the invention, the computer program product further comprises:

computer readable program code means for configuring each process of said at least two concurrently running processes, upon completion of said phase and upon updating of its associated element of said first array, to wait at its associated element of said second array for said release state.

In a sixth aspect of the invention, there is provided a system for synchronizing at least two concurrently running processes in a data processing system, comprising:

(a) means for providing a first array of elements with initialized states, each element of said first array having a concurrently running process associated therewith, each element of said first array being configured to have its state updated by its associated concurrently running process upon completion of a phase by said associated concurrently running process;

(b) means for providing a second array of elements with initialized hold states, each element of said second array having a concurrently running process associated therewith, each element of said second array being configured to switch, upon receiving an instruction, to a release state;

(c) means for monitoring said first array of elements and, upon each element of said first array having had its state updated, generating said instruction for switching said elements of said second array to said release state.

In an embodiment of the sixth aspect of the invention, the system further comprises:

(d) means for each process of said at least two concurrently running processes, configuring said each process such that, upon completion of said phase and upon updating of its associated element of said first array, said each process then waits at its associated element of said second array for said release state.

Other aspects of the invention will become apparent through the illustrative figures and accompanying description provided below.

BRIEF DESCRIPTION OF THE DRAWINGS

In the figures which illustrate example embodiments of this invention:

FIG. 2b is a detailed view of a parallel region of FIG. 2a.

DETAILED DESCRIPTION

Figure 1:
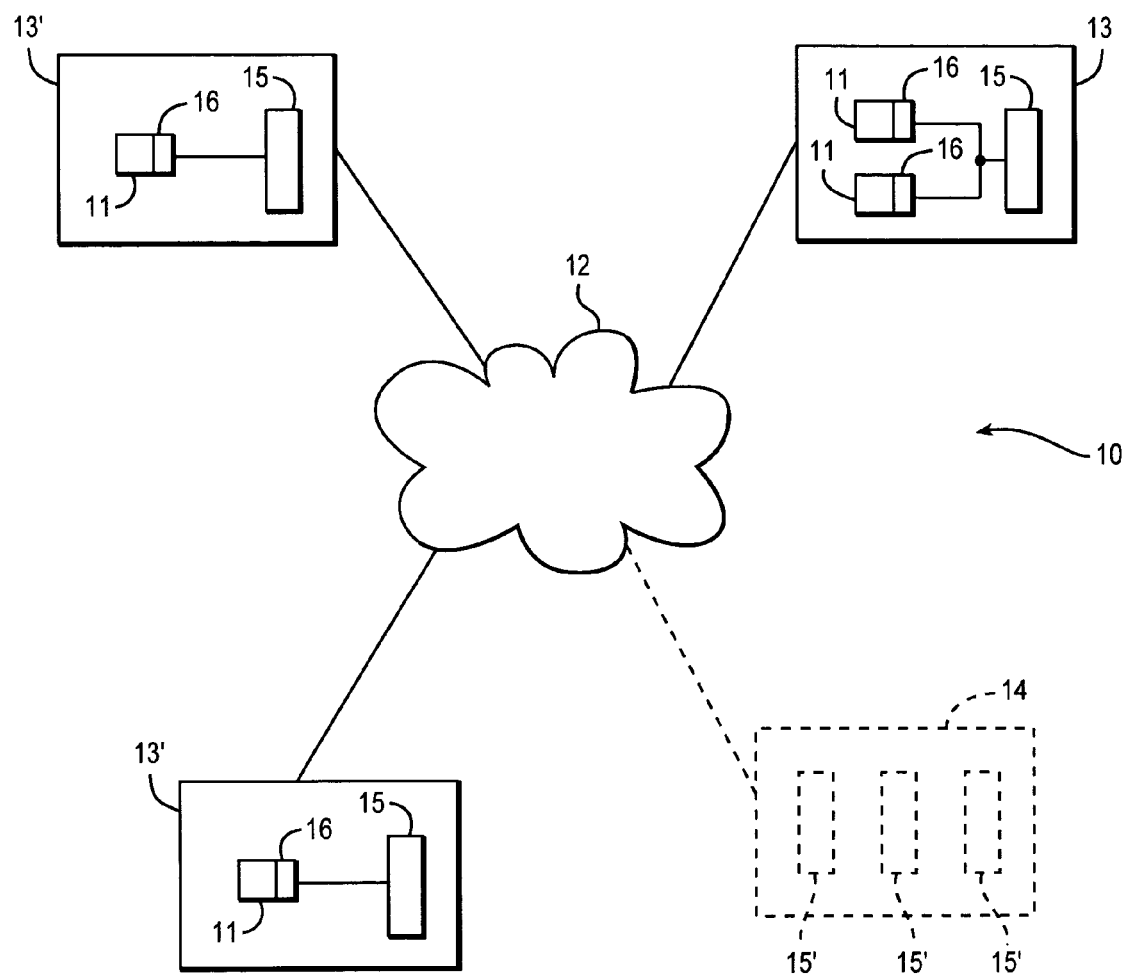
FIG. 1 is a schematic block diagram of a parallel computing system in which the present invention may be embodied.

Referring to FIG. 1, a parallel computing system 10 is shown in which a plurality of processors 11 are interconnected, for example, by means of a network 12. This configuration is intended to be illustrative and not limiting in any way in terms of a parallel computing system that may embody the present invention.

As shown, a plurality of processors 11 may be provided within a single computer 13 or across multiple computers 13, 13' (collectively 13) connected across the network 12. (When a single computer 13 is provided with a plurality of processors 11, and only those processors 11 are used, the single computer 13 may be characterized as a parallel computing system in and of itself.) The plurality of processors 11 may have a logical shared memory 14, represented in dotted outline, which may physically reside on one or more of the computers 13 and map onto a plurality of physical memory modules 15, the mapping being represented by blocks 15' shown in dotted outline. Each of the processors 11 may have access to one or more physical memory modules 15 and/or the logical shared memory 14 on which data and/or executable software may reside. Thus, in this context, an "access" is any hardware, software, network components, network protocols, or any combination of these which enables a processor 11 to access data and/or executable software located anywhere within the parallel computing system 10 of FIG. 1. For the remainder of the description, the term "access" will have this meaning.

Each processor 11 may have a cache 16 for efficiently transferring data between the processor 11 and its associated physical memory 15 (or the logical shared memory 14). There may be a defined minimum size of data or minimum number of words that may be transferred by the cache 16. This defined minimum size of data or minimum number of words is often referred to as a "cache line" or "cache block". For the remainder of the description, the term "cache line" will have this meaning.

Figure 2A:
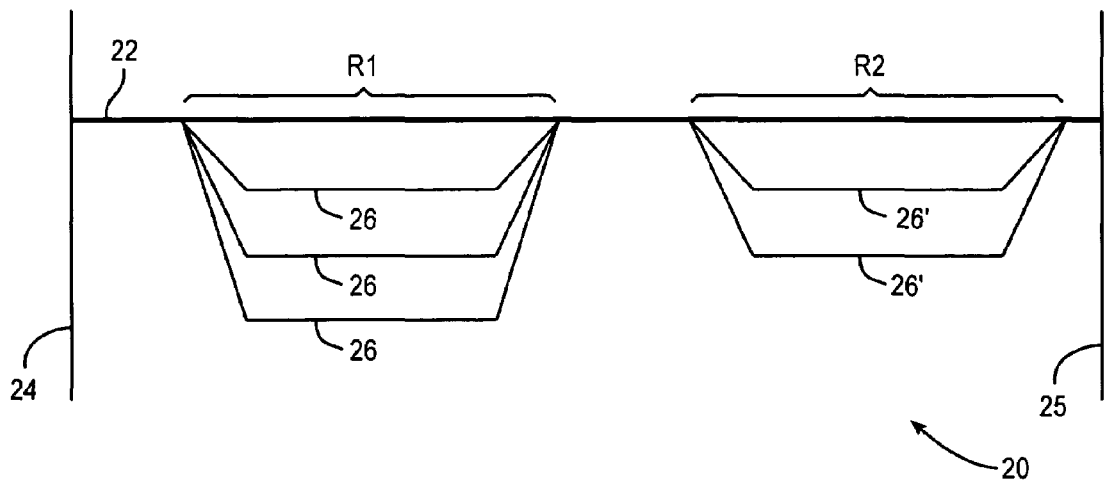
FIG. 2a is a schematic diagram of a number of concurrent processes running in the parallel computing system of FIG. 1.

Referring to FIG. 2a, shown schematically is an example of a software program 20 which may execute within the parallel computing system 10 of FIG. 1. The software program 20 may have a defined master thread or process 22 which runs from the beginning 24 of execution of the software program 20 to its end 25. For example, the master thread or process 22 may execute on a processor 11 in one of the computers 13 of FIG. 1. The software program 20 (which may be initially executed by the master thread or process 22) may also spawn one or more concurrent threads or processes 26, 26' (collectively 26) which may run in parallel with the master thread or process 22 for a portion of the program 20. These concurrent processes 22, 26 may run concurrently on one or more of the processors 11 of FIG. 1. In an embodiment, the software program 20 may assign which processors 11 execute which of the concurrent processes 22, 26 and how the accesses are configured to allow the processors 11 to have access to necessary data and resources within the parallel computing system 10. For the remainder of this description, the terms "thread" and "process" will be used interchangeably and should be considered to have the same meaning, as defined in this paragraph.

The number of concurrent processes 26 spawned by the software program 20 may change over the course of execution of the software program 20. One instance of concurrent processes 26 spawned by the software program 20 may be referred to as a parallel region. In the example shown in FIG. 2a, there are two parallel regions R1, R2 formed during execution of the software program 20. The first parallel region R1 may have associated with it a certain set or subset of processors 11 and logical shared memory 14 required to run the concurrent processes 26 within the region R1. Similarly, second parallel region R2 may have associated with it another set or subset of processors 11 and logical shared memory 14 required to run the concurrent processes 26' within the region R2. For the remainder of this description, the term "parallel region" will have the meaning as defined in this paragraph.

Figure 2B:
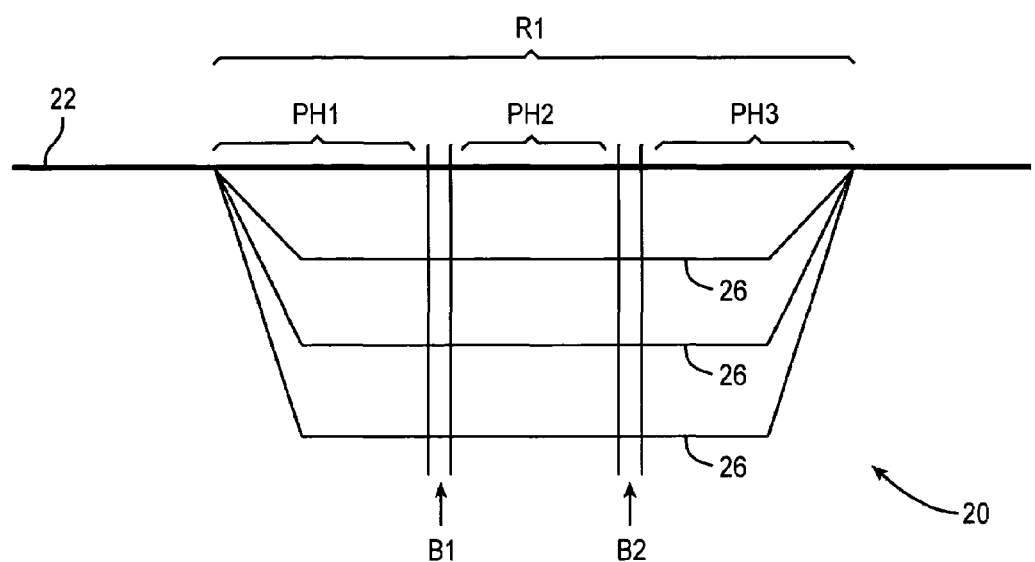

Referring to FIG. 2b, within the first parallel region R1 (or analogously within the second parallel region R2), there may be a number of barriers B1, B2 which separate phases PH1, PH2, PH3 of the software program 20 within that parallel region R1. One phase PH1 may include, for example, a software loop after which interdependencies between one or more of the processes 22, 26 require that synchronization occur at barrier B1. Upon synchronization at barrier B1, the processes 22, 26 may proceed to a second phase PH2. Similar interdependencies between the processes 22, 26 may then require synchronization at a second barrier B2, followed by execution of a third phase PH3. For the remainder of this description, the term "phase" will have the meaning as defined in this paragraph.

Figure 3:
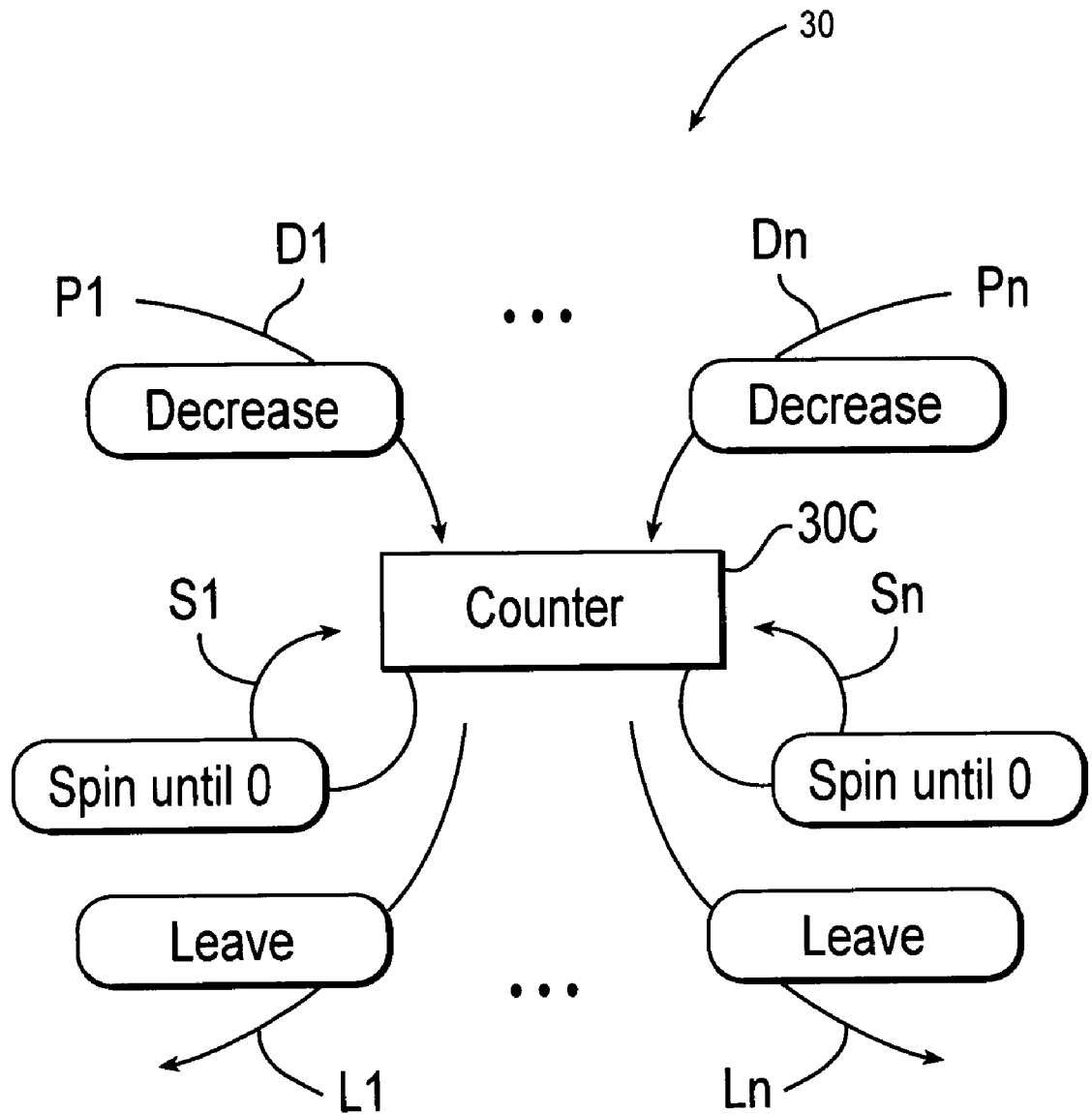
FIG. 3 is a schematic diagram of a barrier implemented with a fetch-and-add operation.

Referring to FIG. 3, shown is a known basic barrier design 30 utilizing a fetch-and-add operation. (In this figure, and subsequent figures, square blocks are used to represent a data structure, and arrow-headed lines with associated comments are used to represent actions that a process may apply to the data structure.) In the basic barrier design 30 shown, a global counter 30C may reside in a shared memory (e.g. memory 14 of FIG. 1) of the parallel computing system (e.g. system 10 of FIG. 1). Concurrent processes P1-Pn are shown in a simplified manner interacting with the counter 30C. Before the start of execution of a phase by the concurrent processes P1-Pn (or at least before the fastest of the concurrent processes P1-Pn comes to the barrier) the value of counter 30C is initialized to the number of concurrent processes participating in the parallel region (e.g. parallel region R1 of FIG. 2a). As the processes P1-Pn come to a barrier point (e.g. barrier B1 of FIG. 2b), each process P1-Pn will decrease the counter 30C with a fetch-and-add operation, as indicated by the "decrease" lines D1-Dn. After that, each process P1-Pn will spin, repeatedly checking the value of the counter 30C, as indicated by "spin" lines S1-Sn, until the value of counter 30C is zero. When the counter 30C reaches a value of zero, the processes P1-Pn are free to leave for their next phase, if any, as indicated by "leave" lines L1-Ln.

The barrier implementation in FIG. 3 is similar to that disclosed in the IBM Technical Disclosure Bulletin entitled "Barrier Synchronization Using Fetch-and-Add Broadcast", referred to above. One difference, however, is that instead of scheduling periodic checks of the counter 30C by each process P1-Pn, a busy-wait method is enforced by letting each process P1-Pn spin and constantly read the shared counter 30C. When processor resources are not needed for other tasks, busy-wait synchronization is preferred over scheduler-based blocking ("blocking" being an operating system scheduling task for removing a thread or process from a processor and putting it on a wait queue). This barrier implementation is relatively simple to implement in terms of coding in a computer program. However, the fetch-and-add operation may make multiple concurrent processes focus on one memory word, possibly resulting in access conflicts.

Figure 4:
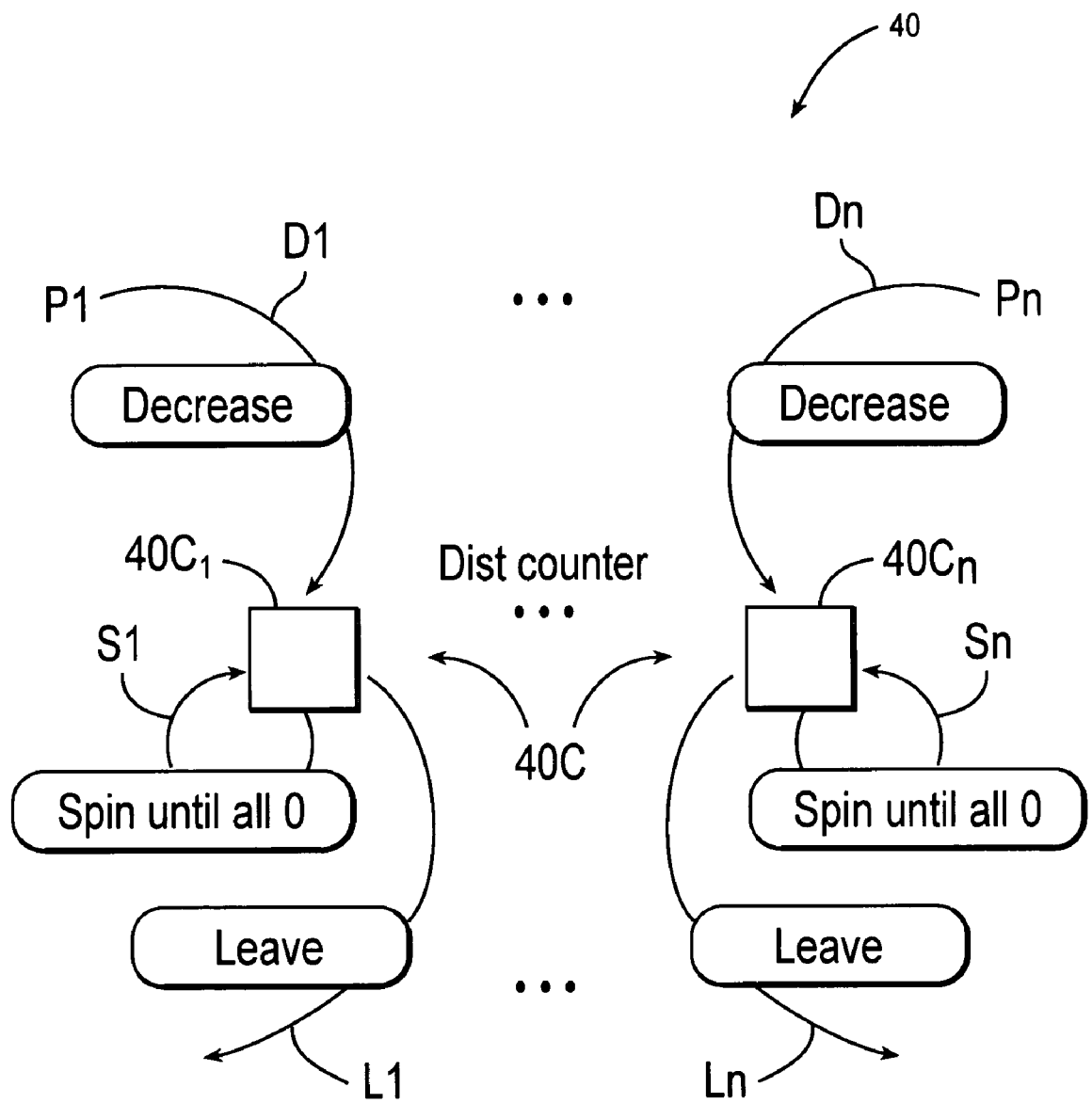
FIG. 4 is a schematic barrier implemented with a distributed counter.

Referring to FIG. 4, another known barrier design 40 having a distributed counter or array 40C is shown.

In the present description, an "array" refers broadly to a logical grouping or arrangement of elements having a common feature or characteristic. This logical grouping or arrangement is not meant to place any restriction or limitation on the physical embodiment. Thus, the term "array" may apply equally to a logical grouping of elements that are provided across a network in a distributed arrangement, and to a logical grouping of elements provided within a local, defined physical space (such as a contiguous area of physical memory 15).

Here, instead of setting up one counter (e.g. counter 30C of FIG. 3) in the shared memory 14 (FIG. 1), multiple elements or counters 40C1-40Cn may be set up as a byte array 40C. The size (i.e. the number of elements) of the array 40C is chosen to be as many as the number of processes P1-Pn in the parallel region.

Before execution, the value of each element or counter 40C1-40Cn may be initialized, for example, to a value of one. As in the case of the fetch-and-add barrier (FIG. 3), each process P1-Pn coming to the barrier point will decrease the distributed counter or array 40C. However, unlike the previous case (FIG. 3), each process P1-Pn decreases its own local element or counter 40C1-40Cn, as indicated by "decrease" lines D1-Dn. In this way the need for a fetch-and-add operation is removed, since for any given element 40C1-40Cn there is only one associated process P1-Pn to write to with a byte operation.

Still referring to FIG. 4, each process P1-Pn spins, as indicated by "spin" lines S1-Sn, at the distributed counter or array 40C until all of the values of each element 40C1-40Cn are zero. For this purpose, each process P1-Pn requires access to all of the elements 40C1-40Cn of the distributed counter 40C to check that all of the processes P1-Pn have decreased their own associated elements 40C1-40Cn to zero. Once all elements 40C1-40Cn in array 40C reach a value of zero, the processes P1-Pn are free to leave for a subsequent phase, if any, as indicated by "leave" lines L1-Ln.

The distributed counter design of FIG. 4 generally outperforms the fetch-and-add design of FIG. 3, as demonstrated by test results presented further below. However, access conflicts may still arise as the processes P1-Pn try to check the values of the elements 40C1-40Cn of array 40C at the same time.

Figure 5:
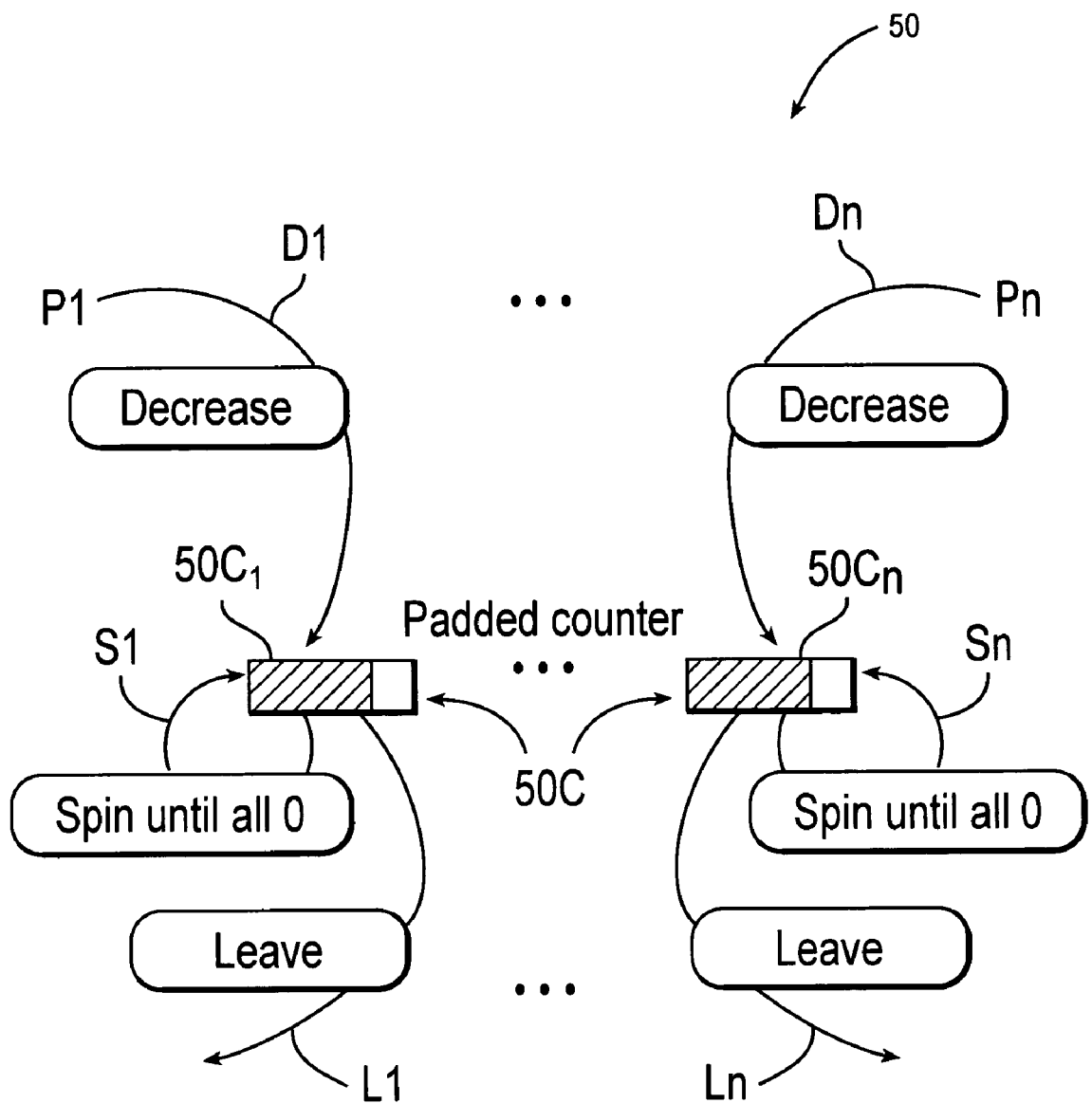
FIG. 5 is a schematic barrier implemented with a padded distributed counter.

Now referring to FIG. 5, to further lessen any potential access conflicts between the processes P1-Pn, a barrier design 50 having a padded distributed counter or array 50C may be utilized. The concept of padding is known to those skilled in the art. In the present illustrative embodiment, each of the counters or elements 50C1-50Cn of the array 50C is placed into different cache lines (i.e. each counter or element 50C1-50Cn is aligned with a portion of logical/physical memory so that the counters or elements 50C1-50Cn avoid sharing the same cache line) and padded to correspond to the size of a cache line. The operation of the barrier 50 with padded distributed counter 50C is substantially as described for the barrier 40 described above. However, padding the data structure to correspond to the size of a cache line results in a significant reduction of potential memory access conflicts by the concurrent processes P1-Pn, since no two counters will share the same cache line. This improvement is demonstrated by test results presented hereinafter.

A potential drawback of the barrier design 50 shown in FIG. 5 is that the memory requirements may be significant, considering the cache line sizes that may be used in modern processor architectures. This potential memory resource issue may be alleviated by limiting the number of cache lines used for the barriers. For example, if a parallel region has two barriers, two counters may be set up in each parallel region, one as a current counter and the other as a next counter. For a given process, the two associated counter elements may occupy one cache line. This will reduce memory consumption, while taking full advantage of the padded distributed counter or array 50C. A sample algorithm for implementing two counters, one as a current counter and the other as a next counter, is shown below.

---

Algorithm 1: Distributed counter barrier with reused counters

Data : Array of two distributed counters, with elements initialized to one
Data : Barrier index, for specifying which counter is the current counter
Begin
    Increase the barrier index;
    Get the current and the next position in the counter array;
    Set my next distributed counter element as one;
    Set my current distributed counter element as zero;
    Repeat
        For each element in current distributed counter Do
            Check if it is zero
        End
    Until all distributed counter elements are zero;
End

---

To reuse the same counter or array, it is necessary to reinitialize the counter elements 50C1-50Cn back to one after a barrier synchronization upon completion of a phase. In case a program encounters multiple barriers in a small period of time, it is necessary to ensure that when the counter is reinitialized for the second barrier, the previous barrier is not contaminated.

Suppose, for example, that the concurrent processes P1-Pn include a very fast process Pf and a very slow process Ps. In a possible scenario, if both the very fast process Pf and the very slow process Ps are free to leave the current barrier, and the very fast process Pf completes its next phase and encounters the next barrier right away, the very slow process may not yet have been able to check all of the elements of counter 50C to realize that it is also free to leave. If the next barrier uses the same counter 50C as the one used for the current barrier, and if the element associated with the very fast process Pf is reinitialized to one in the meantime, the very slow process Ps may not leave the current barrier as expected. In order to avoid this possible problem, two separate counters may be used.

By having at least two counters within a parallel region, the processes P1-Pn can initialize the next counter while leaving the current counter, knowing that no processes are spinning on the next counter. This must be the case as, otherwise, the current counter elements can not be all zero and the processes would not be free to leave.

Figure 6:
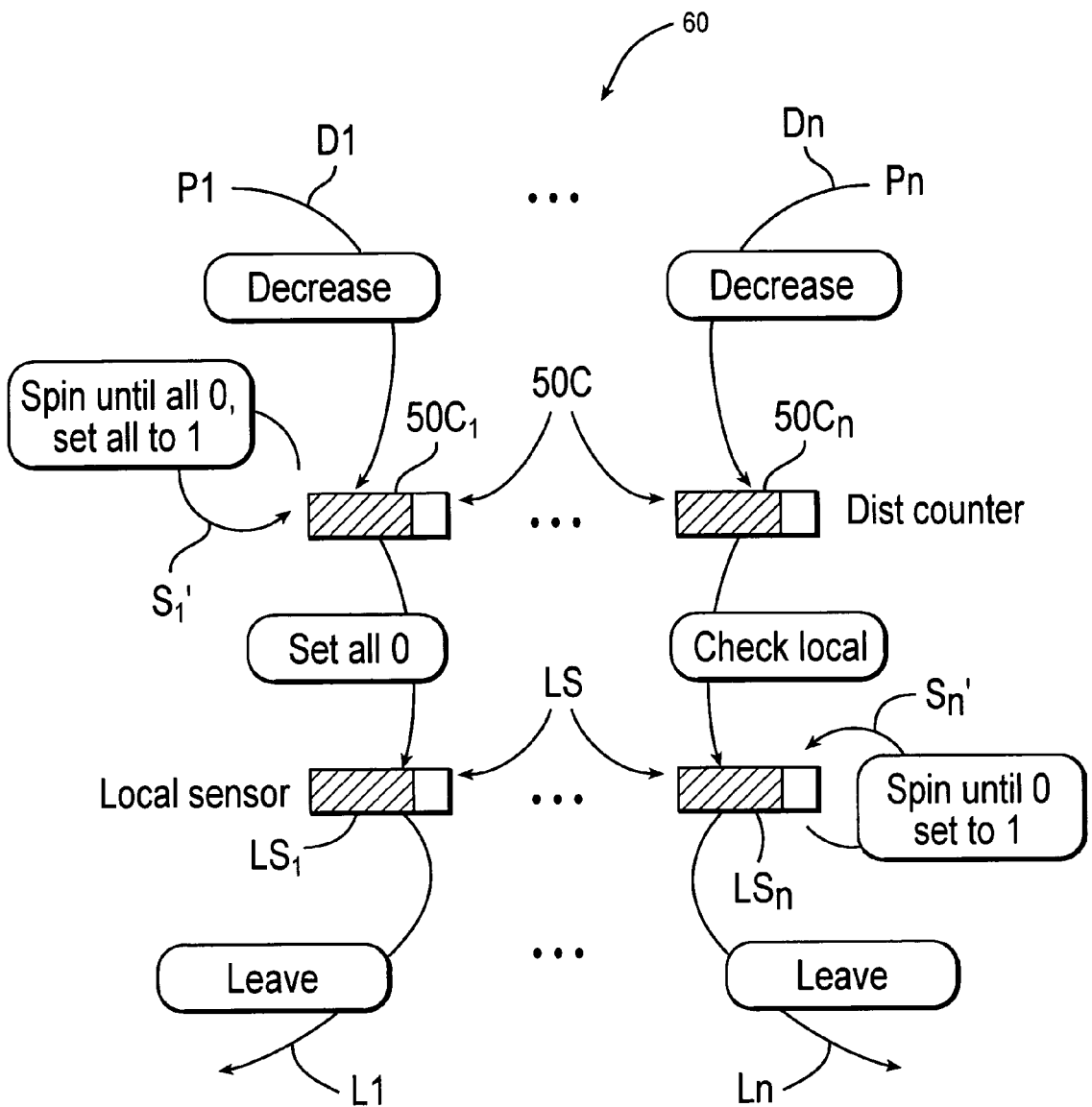
FIG. 6 is a schematic barrier with a distributed counter and local sensor in accordance with an embodiment of the invention.

Referring to FIG. 6, shown is an illustrative example of a barrier 60 having a padded distributed counter or array 50C, as used with the barrier of FIG. 5. As before, each element 50C1-50Cn of the array 50C is associated with one of the processes P1-Pn. In addition, there is provided a plurality of local sensors or elements LS1-LSn. Each sensor or element LS1-LSn is also associated with one of the processes P1-Pn.

While the local sensors or elements LS1-LSn may be located anywhere across the parallel computing system, in an embodiment, each element LS1-LSn may be local to its associated process P1-Pn. In such a case, although the elements LS1-LSn may be logically grouped as an array, they may be characterized as individual sensors having a distributed arrangement. Alternatively, the local sensors or elements LS1-LSn may be formed into a logical group within a defined physical space. In an embodiment, each of the distributed counter or array 50C and the local sensor or array LS may be implemented by an array of cache lines such that each corresponding counter element and local sensor element resides on the same cache line.

Before operation of the barrier 60, each element LS1-LSn corresponding to a local sensor for an associated process is initialized to a value, for example, of one which may represent a "hold" state. All of the elements in the counter 50C may also be initialized to a value of one.

In an embodiment, one process in the group, for instance a master process P1, may be designated to act as if it is the last (slowest) process. Thus, after the master process P1 decreases its associated element 50C1 of the distributed counter 50C, it spins at the counter or array 50C (as indicated by "spin" line S1') to check whether all of the elements 50C1-50Cn are zero. The rest of the processes P2-Pn will decrease their associated counter elements 50C2-50Cn, and then immediately proceed to their own local sensors LS2-LSn to spin there awaiting a switch of the sensor to a leave state (as indicated by "spin" line Sn').

The last process P1, upon detecting that all elements 50C1-50Cn in the counter 50C are zero, may cause an instruction to be sent to all of the local sensors LS1-LSn to change their bits to zero, thus changing the state of those local sensors to a "leave" state. Upon such a change in state, all of the processes, including the last process P1, may leave for the next phase, if any, as indicated by "leave" lines L1-Ln. Advantageously, only the last process P1 (or another independent process) is required to check all of the elements of the padded distributed counter 50C during the barrier synchronization operation.

In an embodiment, the last process P1, upon detecting that all elements 50C1-50Cn in the counter 50C are zero, may immediately reinitialize the value of the elements 50C1-50Cn, prior to instructing the local sensors LS1-LSn to change states. This will allow the same counter 50C to be used for a subsequent barrier operation, as explained further below.

A sample algorithm for implementing the barrier 60 of FIG. 6 is provided below:

---

Algorithm 2: Barrier with distributed counter and local sensor

Data    : Distributed counter with elements initialized to one
Data    : Local sensor with each element initialized as one
Begin
    Decrease my own distributed counter element;
    If I am the designated process then
        Repeat
            For each element in the distributed counter Do
                Check if it is zero
            End
        Until all distributed counter elements are zero;
        For each element in the distributed counter Do
            Set it back to one
        End
        For each element in the local sensor Do set it to zero
    Else
        Repeat
            Check my local sensor element;
        Until it is zero;
    End
    Set my own local sensor element back to one;
End

---

In an alternative embodiment, rather than designating one of the concurrent processes as the last process, an entirely independent process may perform the monitoring function at the counter 50C. In this case, process P1 may also immediately proceed to its associated local sensor LS1 to spin there. When the independent process finds that the counter values are all-zero, it may reinitialize all of the counter elements in counter 50C back to one, and also flip all of the elements in the local sensor to a leave state. At last, when all of the processes P1-Pn leave the barrier, the local sensors LS1-LSn may then be reinitialized back to a hold state.

Again, in order to reduce memory consumption, all barriers within a parallel region may be allowed to share the same pair of counter 50C and sensor LS. Unlike the previous situation (FIG. 5), it is not necessary to have two groups of a counter and a sensor for adjacent barriers, as explained below.

Again, suppose, that the concurrent processes P1-Pn include a very fast process Pf and a very slow process Ps. In the current case (FIG. 6), even if the very fast process Pf is already spinning on checking a sensor for a second barrier, its counter element will not affect the very slow process Ps. This is because, by the time the very fast process Pf can decrease its counter element, the very slow process Ps must have passed re-initialization of the first array, and this operation is done by the slowest process before it frees the very fast process from the first barrier. Thus, in the worst case, the slow thread may be still spinning on checking its local sensor to leave the first barrier at this time.

To further reduce memory consumption, it is also possible, for each process, to merge the associated counter element and the sensor element of FIG. 6 into the same cache line, using different byte positions. However, this may increase barrier overhead as the counter and the sensor may be accessed at essentially the same time in the same synchronization.

EXAMPLE

The inventors conducted a series of tests to compare the performance of various barrier designs. In one test, standard EPCC micro-benchmarks were used. As introduced by J. M. Bull in "Measuring synchronization and scheduling overheads in OpenMP," First European Workshop on OpenMP, October 1999, the "overhead" is considered as the difference between the parallel execution time and the ideal time, given perfect scaling of the sequential program.

The parallel execution time may be taken from the following FORTRAN code:

---

```
        dl = delaylength
        do k=0, outerreps
            start = getclock( )
!$OMP PARALLEL PRIVATE(J)
            do j=1, innerreps
                call delay(dl)
!$OMP BARRIER
            end do
!$OMP END PARALLEL
            time(k) = (getclock( ) - start) *
    &               1.0e6 / dble (innerreps)
        end do
```

---

The sequential reference time may be measured through the following FORTRAN code:

---

```
        dl = delaylength
        do k=0, outerreps
            start getclock( )
            do j=1, innerreps
                call delay (dl)
            end do
            time(k) = (getclock( ) - start) *
    &               1.0e6 / able (innerreps)
        end do
```

---

In the test program used for the tests by the inventors, the value of outerreps was set to 50. The array variable time was then used to compute the mean and standard deviation of the 50 measurements.

The hardware system used by the inventors for the tests comprised a 1.1 GHz 32-way POWER4, with AIX 5.1, VisualAge C/C++ 6.0 and XL FORTRAN 8.1 installed.

Figure 7:
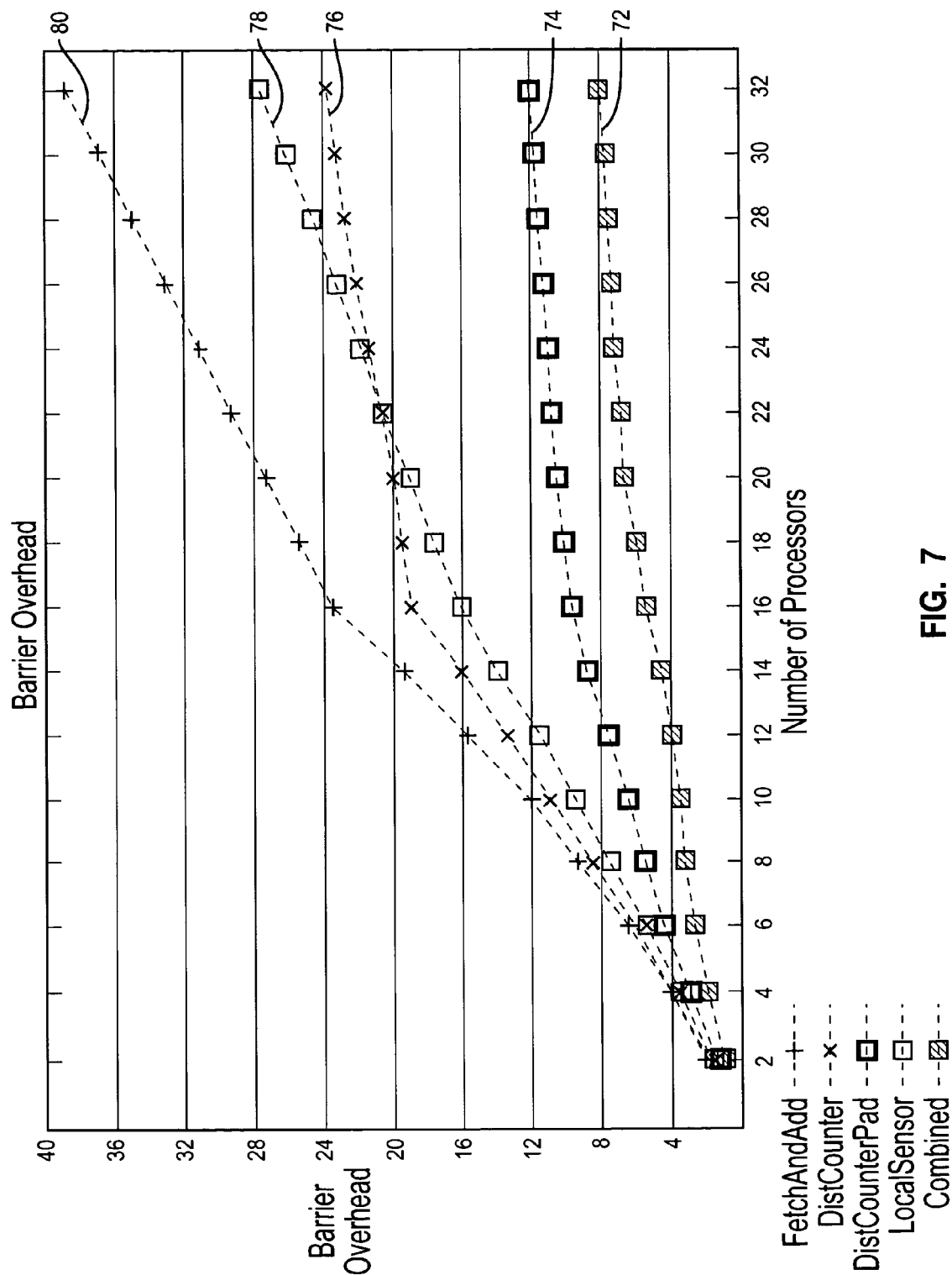
FIG. 7 is a graphical representation of test results for the barrier designs of FIG. 3 to FIG. 6.

Referring to FIG. 7, the performance results for the tests are shown. The bottom curve 72 represents the overhead for a barrier combining a distributed counter and a local sensor, in accordance with an embodiment of the invention (FIG. 6). In comparison to the performance results for a barrier with a fetch-and-add design (FIG. 3), represented by the top curve 80, the barrier combining the padded distributed counter and local sensor (FIG. 6) showed a significant improvement in performance. The test results also show that the barrier design of the present invention (curve 72) provides an improvement over the use of a local sensor alone (curve 78), a distributed counter alone (curve 76), and a padded distributed counter alone (curve 74).

While illustrative embodiments of the present invention have been shown and described, various modifications will be apparent to those skilled in the art.

For example, while each element of the first array has been generally referred to as a counter, it will be appreciated that each element of the first array may be a gate, a flag, a switch, or, generically, a state machine having two or more states. Similarly, each element of the second array may be one of a counter, a gate, a flag, a switch, or, generically, a state machine having two or more states (e.g. a hold state and a release state). Various other implementations may be possible.

Therefore, the invention is defined in the following claims.

The invention claimed is:

1. A method in a data processing system for synchronizing N concurrently running processes in the data processing system at a first phase before allowing the N processes to proceed to a second phase, N>=2, comprising:

providing a first array of N elements initialized each to a first state wherein each $i^{th}$ element of said first array is associated with an $i^{th}$ concurrently running process which will update the $i^{th}$ element of the first array to a second state in response to completing the first phase, where 1=i<=N;

providing a second array of N elements initialized each to a hold state wherein each $i^{th}$ element of said second array is associated with the $i^{th}$ concurrently running process associated with the $i^{th}$ element of the first array and is used to hold the $i^{th}$ associated concurrently running process at the first phase, and is enabled to switch, in response to receiving a release instruction, to a release state to release the $i^{th}$ associated concurrently running process to proceed to the second phase; and using a designated process configured to ascertain when the N elements of the first array are updated to the second state to issue the release instruction to allow the N processes to proceed to the second phase, each $i^{th}$ process of said N concurrently running processes waits at its $i^{th}$ associated element of said second array for said release state in response to completing the first phase and updating the $i^{th}$ associated element of the first array; and wherein after the N elements of said first array are updated to the second state, and prior to issuance of the release instruction the N elements of said first array are reinitialized to the first state.

2. The method recited in claim 1, wherein each $i^{th}$ element of said first array has a byte size corresponding to a size of a cache line used in said data processing system.

3. The method recited in claim 2, wherein each $i^{th}$ element of said second array has a byte size corresponding to the size of said cache line used in said data processing system.

4. The method recited in claim 3, wherein each $i^{th}$ element of said second array is provided locally in relation to its $i^{th}$ respective, associated process.

5. The method recited in claim 1, wherein the designated process is one of said N concurrently running processes.

6. The method recited in claim 1, wherein the designated process is not one of the N concurrently running processes.

7. The method recited in claim 1, wherein each $i^{th}$ element of said first array and said second array comprises a state machine.

8. The method recited in claim 7, wherein said state machine is one of a counter, a gate, a flag and a sensor.

9. A system having at least one processor for processing instructions to synchronize N concurrently running processes at a first phase before allowing the N processes to proceed to a second phase, where N>=2, the instructions comprising instructions to use:

a first array of N elements initialized each to a first state, each $i^{th}$ element of said first array having an $i^{th}$ concurrently running process associated therewith which will update the $i^{th}$ element of the first array to a second state in response to completing the first phase, where 1=i<=N;

a second array of N elements with each element initialized to a hold state wherein each $i^{th}$ element of said second array is associated with the $i^{th}$ concurrently running process associated with the $i^{th}$ element of the first array and is used to hold the $i^{th}$ associated concurrently running process at the first phase, and is enabled to switch, in response to receiving a release instruction, to a release state to release the $i^{th}$ associated concurrently running process to proceed to the second phase;

a designated process configured to ascertain when the N elements of the first array are updated to the second state to issue the release instruction to allow the N processes to proceed to the second phase, each $i^{th}$ process of said N concurrently running processes waits at its $i^{th}$ associated element of said second array for said release state in respsonse to completing the first phase and updating the $i^{th}$ associated element of the first array; and wherein after the N elements of said first array are undated to the second state, and prior to issuance of the release instruction the N elements of said first array are reinitialized to the first state.

10. The system recited in claim 9, wherein each $i^{th}$ element of said first array has a byte size corresponding to a size of a cache line used in said data processing system.

11. The system recited in claim 10, wherein each $i^{th}$ element of said second array has a byte size corresponding to the size of said cache line used in said data processing system.

12. The system recited in claim 9, wherein each $i^{th}$ element of said second array is provided locally in relation to its respective, $i^{th}$ associated process.

13. The system recited in claim 9, wherein each $i^{th}$ element of said first array and said second array is a state machine.

14. The system recited in claim 9, wherein said state machine is one of a counter, a gate, a flag and a switch.

15. The system recited in claim 9, wherein said N concurrently running processes execute on multiple processors embodied within a single computer.

16. The system recited in claim 9, wherein said N concurrently running processes execute on multiple processors distributed across multiple computers connect across a network.

17. A computer program product for synchronizing N concurrently running processes in a data processing system at a first phase before allowing the N processes to proceed to a second phase, N>=2, the computer program product comprising:

a computer useable medium having computer readable program code means embodied in the medium for synchronizing the N concurrently running processes, the computer program code means including:

computer readable program code means for providing a first array of N elements initialized each to a first state, each $i^{th}$ element of said first array being associated with an $i^{th}$ concurrently running process which will update the $i^{th}$ element of the first array to a second state in response to completing the first phase, where 1=i<=N;

computer readable program code means for providing a second array of N elements initialized each to a hold state, each $i^{th}$ element of said second array being associated with the $i^{th}$ concurrently running process associated with the $i^{th}$ element of the first array and is enabled to hold the $i^{th}$ associated concurrently running process at the first phase and to switch, in response to receiving a release instruction, to a release state to release the $i^{th}$ associated concurrently running process to proceed to the second phase; and computer readable program code means for monitoring said first array of N elements and, in response to each $i^{th}$ element of said first array having had its state updated, generating said instruction for switching said N elements of said second array to said release state to allow the N processes to proceed to the second phase, said computer readable program monitoring code means including computer readable program code means for processing a designated process to monitor the first array of N elements and issue the generated instruction, each $i^{th}$ process of said N concurrently running processes waits at its $i^{th}$ associated element of said second array for said release state in response to completing the first phase and updating the $i^{th}$ associated element of the first array; and wherein after the N elements of said first array are undated to the second state, and prior to issuance of the release instruction the N elements of said first array are reinitialized to the first state.

18. A system for synchronizing N concurrently running processes at a first phase before allowing the N processes to proceed to a second phase, N>=2, comprising:

a processor;

means for providing a first array of N elements initialized each to a first state each $i^{th}$ element of said first array being associated with an $i^{th}$ concurrently running process which will update the $i^{th}$ associated element of the first array to a second state in response to completing the first phase, where 1=i<=N;

means for providing a second array of N elements initialized each to a hold state, each $i^{th}$ element of said second array being associated with the $i^{th}$ concurrently running process associated with the $i^{th}$ element of the first array and is enabled to hold the $i^{th}$ associated concurrently running process at the first phase and is enabled to switch, in response to receiving a release instruction, to a release state to release the $i^{th}$ associated concurrently running process to proceed to the second phase; and means for monitoring said first array of N elements and, upon each $i^{th}$ element of said first array having had its state updated, generating said instruction for switching said N elements of said second array to said release state to allow the N processes to proceed to the second phase, said monitoring means including a process designated to monitor the first array of N elements to determine when the N elements of the first array are updated to the second state and to issue the generated instruction when processed by a processor, each $i^{th}$ process of said N concurrently running processes waits at its $i^{th}$ associated element of said second array for said release state in response to completing the first phase and updating the $i^{th}$ associated element of the first array; and wherein after the N elements of said first array are updated to the second state, and prior to issuance of the release instruction the N elements of said first array are reinitialized to the first state.

* * * * *